United States Patent Office 3,202,505
Patented Aug. 24, 1965

3,202,505
METHOD OF MANUFACTURING TUNGSTEN FROM AMMONIUM PARATUNGSTATE
Pieter van den Berg, Thomas Antonius Cornelis Jacobs, and Arnoldus Wilhelmus Joseph Verheijen, Eindhoven, Netherlands, assignors to North American Philips Company, Inc., New York, N.Y., a corporation of Delaware
Filed July 10, 1962, Ser. No. 208,811
Claims priority, application Netherlands, July 17, 1961, 267,184
2 Claims. (Cl. 75—84)

This invention relates to methods of manufacturing tungsten from ammonium paratungstate while using potassium silicate as a dope.

By a method generally used for this purpose, the ammonium paratungstate is either converted to $WO_3$ by heating in air, or reduced to $WO_{2.9}$. The metal in the pulverulent state may subsequently be obtained from the tungsten oxide by heating in a reducing atmosphere. The further treatment of the powdery metal depends upon the purpose for which it is to be used. It may be converted, for example, to so-called ductile tungsten by methods known per se.

The powder is pressed to form rods for the manufacture of filaments for electric lamps. Such rods are pre-sintered in an oven at a temperature usually from 1,000° to 1,200° C. and then heated in an atmosphere of hydrogen by direct passage of electric current until the density necessary for further treatment is reached. The current strength employed is usually increased to about 90% of that at which the rod would melt.

The sintered bodies thus obtained may subsequently be brought to the desired diameter by swaging and drawing.

It is known that the results of this method are influenced by a small amount of potassium silicate and/or the reaction products thereof. This substance influences not only the recrystallization temperature and the shape of the tungsten crystals obtained in the filaments after recrystallization, but also the sintering mechanism and the process of the reduction of the tungsten oxide to powdery metal. In practice the potassium silicate is added either to the $WO_3$ or to the $WO_{2.9}$.

It is desirable for the rods to have already a minimum apparent density of about 10 g./c.cm. prior to sintering. It has been found that in many cases such density can be obtained only by using extremely high pressures in moulding rods from the powdery metal, the density-pressure diagram often showing sharp bends. In this case fractures and cracks readily occur in the rods. This source of loss is very detrimental in the economic respect. Moulding errors occur more particularly if the powdery metal after its manufacture is washed with strong acids for removing undesirable excess residues of dope.

It has been found that moulding errors may be avoided wholly or substantially by modification of the described method of manufacturing tungsten powder from ammonium paratungstate with the use of potassium silicate as a dope. According to the invention, to this end, the ammonium paratungstate is reduced to ammonium tungstenbronze by heating from 400° C. to 600° C. in a reducing atmosphere until a bronze having a minimum ammonia content of 0.5% has formed, whereafter the dope is added and the mixture reduced to tungsten.

The term "ammonium tungstenbronzes" is be understood to mean compounds according to the general formula $(NH_4)_xWO_3$, wherein x is ~0.3 in theory. $(NH_4)_{0.3}WO_3$ contains about 2.1% by weight of $NH_3$.

It has been found that the hexagonal crystal lattice of this compound which is desirable for optimum results is retained during the first reducing step until the percentage of ammonia decreases to a minimum of about 0.5% by weight corresponding to a formula of $$(NH_4)\sim_{0.06}WO_3$$

The bronze obtained by the method according to the invention has a blue-black colour.

The first reduction is carried out at a temperature from 400° C. to 600° C., it being possible during this treatment to profit by the separation of the liberated ammonia into nitrogen and hydrogen occurring in heating the paratungstate.

Preferably, during the first stage, a bronze is manufactured having an ammonia content of about 0.8% by weight, corresponding to a theoretical formula of $(NH_4)_{0.1}WO_3$. To this end, the temperature during reduction is maintained at 450° C.±30° C. It has been found that optimum results in the technological respect may be obtained with the tungsten powder manufactured from such bronze.

After the first reduction, the resulting ammonium tungstenbronze is mixed with potassium silicate and, if desired, other substances such, for example, as aluminum nitrate. Subsequently, the bronze is reduced by heating in a reducing atmosphere.

Example I

Ammonium paratungstate is heated from 450° C. to 475° C. within 100 minutes. To this end a vessel filled with amonium paratungstate is moved at a speed of 4 cm./min. through a tubular oven having an annealing zone of 4 metres long, the initial temperature of which is 450° C. and gradually increases to 475° C. at the end of the zone. During reduction, hydrogen is led into the tube at a superatmospheric pressure of 20 cms. water column in the whole system. After cooling, the material is found to be a bronze having an ammonia content of 0.8% corresponding to a formula of $(NH_4)_{0.1}WO_3$.

The bronze is mixed with an amount of potassium silicate such that 0.5 g. of silicon dioxide is present per 100 gs. of bronze. To this end, the powdered bronze is mixed with an aqueous solution of potassium silicate, whereafter the mixture is dried.

The bronze provided with the dope is then reduced to metal in the usual manner by leading it through a tubular oven in which the temperature of the annealing zone increases from 700° C. to 900° C. After being reduced in the usual manner, the powdery metal is washed with strong acids and then with water.

If desired, a bronze having a lower or higher content of ammonia may be obtained in a similar manner by means of a longer or shorter stay period in the annealing zone by varying either the speed of flow of the hydrogen or the temperature variation in the tubular oven. For the described effect on the mouldability of the powdery metals manufactured from the bronze it is necessary, however, to prevent the ammonia content of the bronze from decreasing to such an extent that the resulting material no longer has a hexagonal crystal structure. As previously mentioned, the minimum ammonia content permissible is about 0.5% by weight.

The effect of the method according to the invention appears from the example following hereinafter and from the attached drawing, in which.

Example II

From the same charge of ammonium paratungstate, one portion was converted to powdery tungsten (see Example I) and another portion was first converted to $WO_{2.9}$ by reduction and then, after adding potassium silicate, reduced to powdered tungsten in the manner described in Example I. The same amount of silicate as specified in Example I was added to each material.

Figure 1:
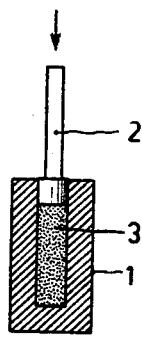
FIGURE 1 is a cross-section of a matrix for moulding small tablets from powdered metal.

25 gs. of each amount were brought in each case into the cavity of a mould 1 of the shape shown in FIGURE 1, whereafter a piston 2, weighing 40 kgs., was placed on the material. By means of a self-recording arrangement (not shown) the variation in length of the rod 3 was measured with constant increasing load by the piston.

Figure 2:
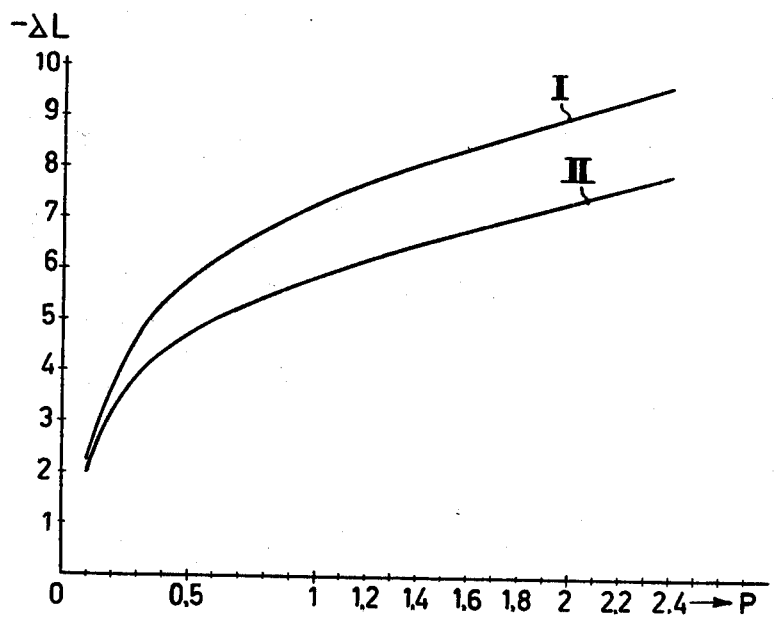
FIGURE 2 is a graph showing the variation in length in millimetres with respect to the load in tons/sq. cm.

FIGURE 2 shows two curves I and II illustrating the variation in length of the rod 3 for each pressure up to 2.4 tons per sq. cm. Curve I pertains to powdery tungsten manufactured in accordance with the invention and curve II pertains to powdery tungsten manufactured by the known method.

It may clearly be seen from the curves that the compressibility of the material corresponding to curve I decreases much more gradually than that corresponding to curve II, while the total compressibility is greater.

This means that the density of the first-mentioned material when loaded increases much more gradually. Shears and differences in stress in the moulded rod are thus avoided completely or substantially. The loss resulting from moulding faults is in practice smaller by a factor 5 to 25.

What is claimed is:
1. A method of manufacturing tungsten metal from ammonium paratungstate with the use of potassium silicate as a dope, comprising the steps reducing the ammonium paratungstate to ammonium tungsten bronze by heating it from 400° to 600° C. in a reducing atmosphere until a bronze having at least an ammonia content of 0.5% by weight has formed, adding the dope and heating the resultant mixture in a reducing atmosphere to thereby reduce the bronze to tungsten.

2. The method of claim 1 wherein the first reduction is carried out at a temperature of 450° C.±30° C.

References Cited by the Examiner
UNITED STATES PATENTS

| | | | |
|---|---|---|---|
| 1,558,000 | 10/25 | Fernberger | 75—84 |
| 2,316,583 | 4/43 | Highriter | 75—84 |
| 2,385,843 | 10/45 | Rennie | 75—84 |
| 2,402,084 | 6/46 | Rennie | 75—84 |
| 2,806,774 | 9/57 | Millner et al. | 75—84 |
| 2,966,406 | 12/60 | Spier et al. | 75—84 |

CARL D. QUAFORTH, *Primary Examiner.*

OSCAR R. VERTIZ, *Examiner.*